Sept. 21, 1937.   W. S. CLARKSON   2,093,418
AUTOMATIC LIQUID WEIGHT METER
Filed May 9, 1935   2 Sheets-Sheet 1
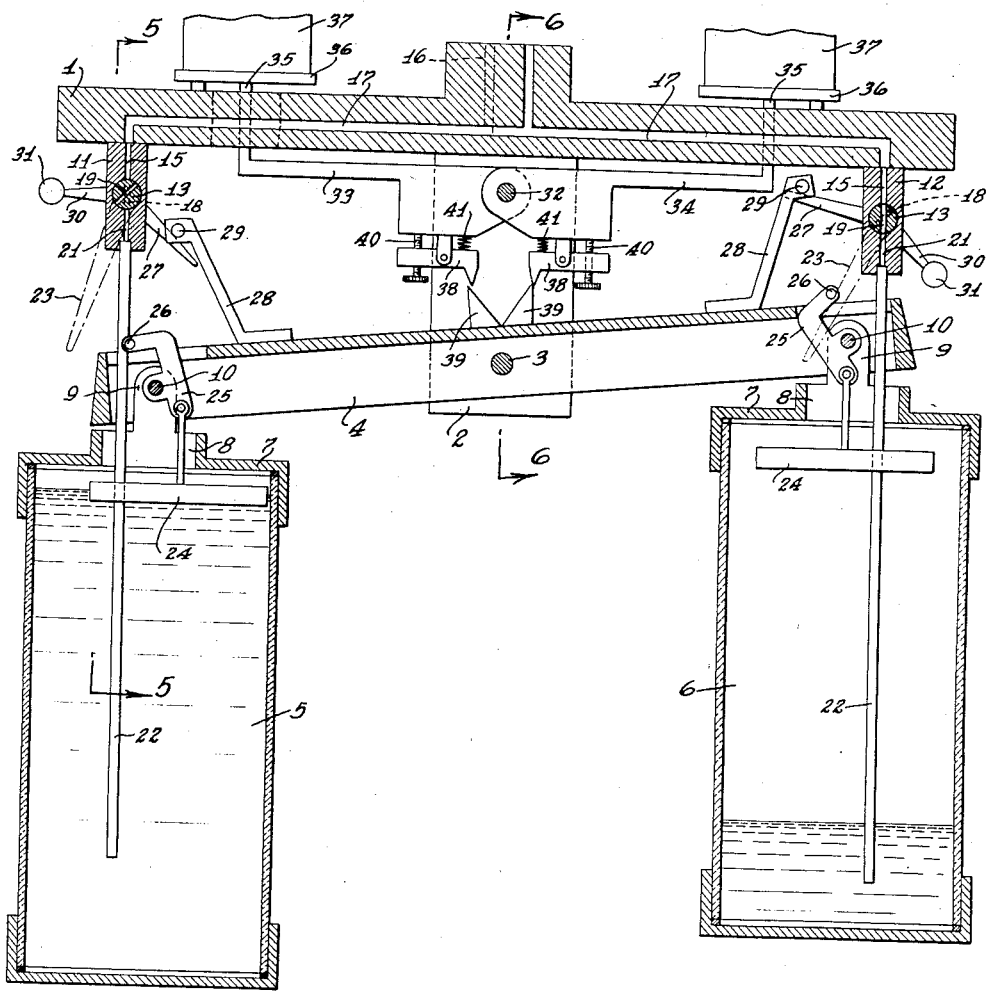
Fig. 1.
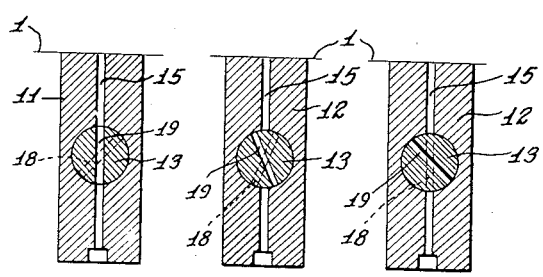
Fig. 2.   Fig. 3.   Fig. 4.
INVENTOR.
William S. Clarkson
BY
ATTORNEYS Sept. 21, 1937.  W. S. CLARKSON  2,093,418
AUTOMATIC LIQUID WEIGHT METER
Filed May 9, 1935  2 Sheets-Sheet 2
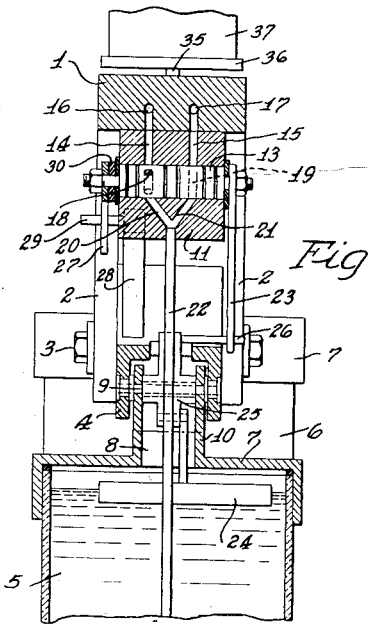
Fig. 5.
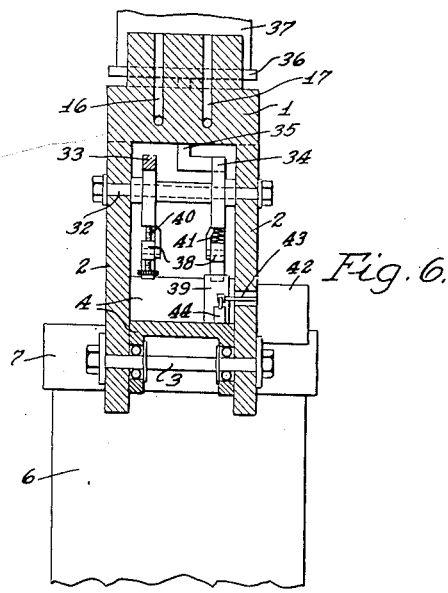
Fig. 6.
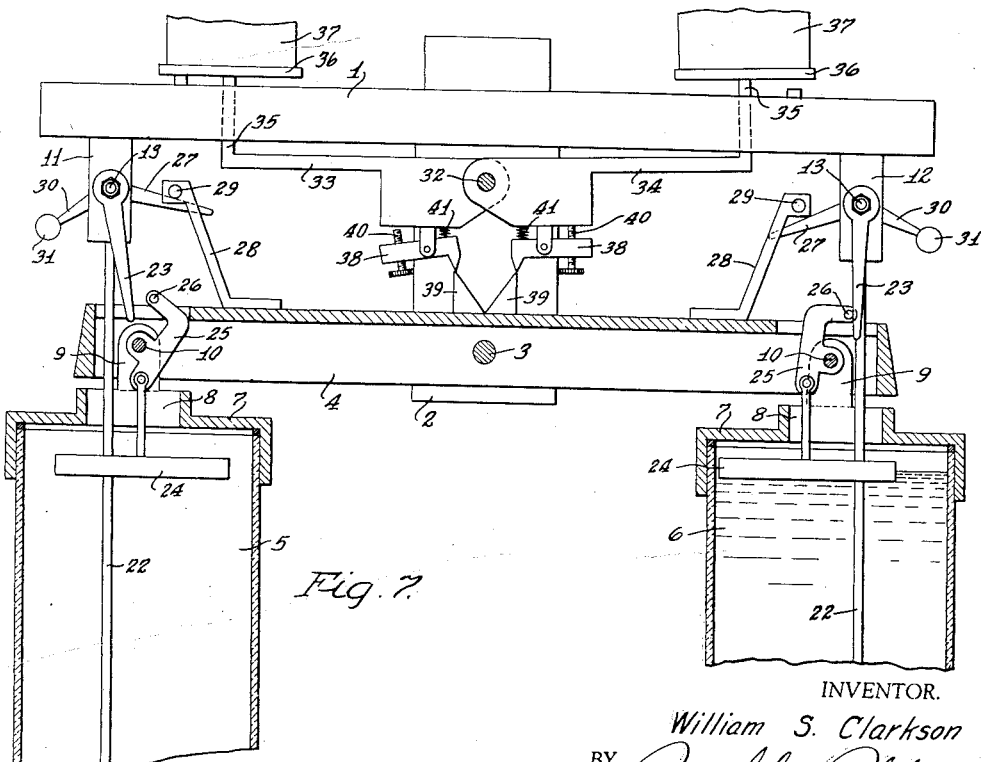
Fig. 7.
INVENTOR.
William S. Clarkson
BY 
ATTORNEYS Patented Sept. 21, 1937

2,093,418

UNITED STATES PATENT OFFICE 2,093,418

AUTOMATIC LIQUID WEIGHT METER

William S. Clarkson, Ann Arbor, Mich.

Application May 9, 1935, Serial No. 20,528

9 Claims. (Cl. 249—26)

The present invention relates to an automatic liquid weight meter.

The primary object of the present invention is to provide a device adapted to be installed between a liquid reservoir and a point of consumption or dispensation of the liquid for measuring by weight the amount of liquid being consumed or dispensed. In this connection the invention provides metering apparatus including a scale beam pivoted intermediate its ends and supporting a container at each end, and mechanism in combination therewith and functioning with each rocking movement of the beam for alternately connecting the containers with a liquid supply conduit and to a liquid discharge conduit. That is to say, when one container is connected to the supply conduit the other container is connected to the discharge conduit and with each rocking movement of the scale beam the order is reversed. Therefore, while the device is functioning liquid is constantly discharging from one container and constantly entering another container and when a predetermined weight differential exists between the liquids in the two containers the scale beam is caused to rock. Means is provided for determining and for regulating the weight differential at which the scale beam rocks so that a definite amount of liquid may be discharged from the containers before the successive functions of the scale beam take place and therefore by counting the movements of the scale beam the device may serve as a weighing apparatus for dispensing measured quantities of liquid. Due to the fact that during functioning of the device a filled container is connected to the discharge conduit almost simultaneously with the disconnection of an emptied container the interruption in the flow of liquid is inappreciable and the device may be used for measuring liquids passing through a line where a constant flow of liquid is required.

With the above and other ends in view the invention consists in matters more particularly set forth with reference to the accompanying drawings, in which—

Figure 1 is a vertical cross section;

Figs. 2, 3, and 4 are cross sections of a valve, illustrating different stages in the operation;

Figs. 5 and 6 are sections taken substantially along the lines 5—5 and 6—6 respectively of Fig. 1, the valve mechanism in Fig. 5 being positioned different than in Fig. 1 in order to illustrate another stage in the operation, and Fig. 7 is a vertical section illustrating another stage in the operation.

Like characters of reference are employed throughout to designate corresponding parts.

The numeral 1 designates a body having depending brackets 2 supporting a trunnion shaft 3 upon which is mounted a scale beam 4. At opposite ends of the scale beam are respectively mounted liquid containers 5 and 6, the containers each having caps 7 formed with openings 8 and brackets 9 received on trunnion shafts 10, the latter being supported in the scale beam 4 adjacent to the ends thereof. It is obvious, therefore, that the containers 5 and 6 are suspended from the scale beam 4 so that their centers of gravity are disposed in the same vertical planes as the axes of the trunnions 10 and that this condition is not changed through rocking movement of the scale beam.

Mounted beneath the body 1 and above the containers 5 and 6 respectively are valve housings 11 and 12 having rotary valves 13 therein. Each valve housing has two ports 14 and 15, the former being connected to an outlet or discharge conduit 16 in the body 1 and the latter being connected to a supply conduit 17 in the body 1. The valve 13 has two diametric ports 18 and 19, relatively staggered, and positioned longitudinally so as to register with the ports 14 and 15. The bodies 11 and 12 also have ports 20 and 21 with one of their ends in line with the diametric ports 18 and 19 respectively and their other ends communicating with tubes 22 extending into the containers 5 and 6 respectively.

On one end of each valve 13 is mounted an arm 23 and in each container, 5 and 6, is provided a float 24 connected to one end of a rocking lever 25. A rocking lever 25 is journalled on each trunnion 10 and each lever 25 carries a pin 26, stationary with respect thereto, and projecting laterally and adapted to strike the arm 23.

On the other end of each valve 13 is mounted a radially extending arm 27 and adjacent to each end of the scale beam 4 is a bracket 28 supporting a pin 29. Each pin 29 is adapted to strike the radial arm 27 at its respective end of the beam. Also mounted on each valve 13 is a radially extending arm 30 carrying a counterbalancing weight 31.

Mounted in the depending brackets 2 is a trunnion shaft 32. Journalled on the shaft 32 and projecting radially in opposite directions with respect thereto are arms 33 and 34 having vertically extending portions 35 extending through apertures in the body 1 and supporting weight pans 36 for the reception of weights 37. Each arm, 33 and 34, supports a pivoted pawl 38 and each pawl has a spring 41 opposing pivotal movement in one direction and a set screw 40 positively limiting pivotal movement in the other direction. On the scale beam 4, adjacent to each pawl 38 is provided a rigid lug 39.

In describing the operation of the device reference will first be had to Fig. 1 wherein the container 5 is illustrated as being completely filled with liquid and the container 6 is emptied of liquid. It will be noted that the container 6 still has a quantity of liquid therein and that this condition always exists because the liquid is removed from the containers by pressure less than atmospheric pressure. At this stage in the operation the pin 29, adjacent the arm 27 on the valve 13 which is disposed in the valve housing 11 adjacent to the container 5, is in engagement with arm 27 and is holding the latter in a position with the diametric port 18 registering with the valve housing ports 14 and 20, and with the diametric port 19 out of register with the valve body ports 15 and 21. The liquid in the container 5 is withdrawn therefrom through tube 22, port 20, port 18, port 14 and conduit 16. At this time the scale beam 4 will be inclined and will have elevated the pin 29 at the other end so that the weight 31 rotates the valve 13 in the body 12 to hold the diametric port 18 out of register with ports 14 and 20 and to hold the diametric port 19 in register with the ports 15 and 21. Communication between the container 6 and the conduit 16 is thus prevented and communication between the container 6 and the conduit 17 is established. Conduit 17 is described as the supply conduit and for the purpose of an understanding of the invention it will be assumed that this conduit is connected to a liquid reservoir so that liquid flows by force of gravity from the reservoir to the conduit. Accordingly, liquid enters the container 6.

As the container 5 is emptied of liquid and the container 6 is filled with liquid the scale beam is biased by the heaviest container and will tend to rock. However, the pawl 38 on the arm 34 is held by its respective spring 41 so that it projects into the path of movement of the lug 39 adjacent thereto and in order for the scale beam to rock from the position shown in Fig. 1 the difference in weight between containers 5 and 6, assuming that the container 5 is becoming emptied and the container 6 is becoming filled, must be sufficient to brush the lug 39 past the pawl 38 on the arm 34. To do this the arm 34 must pivot against the opposition of the weight 37 thereon because the set screw 40 holds the pawl 38 against pivotal movement. Accordingly, by varying the weight 37 the opposition to movement of the scale beam 4 may be varied and the weight differential at which the beam rocks may be varied.

During the function of the above described pawl and lug, the other lug 39 will engage the other pawl 38 and, due to the fact that the spring 41 may be compressed by pressure considerably less than that required to pivot the arm 33, the pawl 38 on the arm 33 pivots with respect thereto and allows its respective lug 39 to pass freely thereunder. It will be seen, therefore, that the sole purpose of the springs 41 is to hold the pawls 38 projecting into the paths of movement of their respective lugs 39 and these springs cooperate with the set screws 40 to provide for a function wherein movement of the lugs 39 in one direction may take place without effecting movement of the arms 33 and 34 whereas movement of the lugs in the opposite direction causes the arms 33 and 34 to be pivoted. The two lugs 39 obviously move in unison and therefore the order of functioning the respective pawls is arranged so that one causes movement of its respective arm when the other functions to cause its respective arm to remain stationary.

As the weight of liquid in the container 6 has a weight advantage over that in the container 5 sufficient to cause rocking movement of the beam against the opposition of the weight 37 on the arm 34 the latter moves through the position shown in Fig. 7. Prior to this movement the liquid in the container 6 will have elevated the float 24 therein and the lever 25 will have moved and its pin 26 will have engaged the arm 23 so that the latter has moved the valve 13 in the housing 12 to a position where diametric ports 18 and 19 are out of register with the ports 14 and 20 and 15 and 21 respectively, as shown in Fig. 3. At the time the scale beam starts to rock, the pin 29 adjacent to the valve housing 11 is moved upwardly and the arm 27 is free to move. At this time the weight 31 moves the valve 13 in housing 11 to a position where both diametric ports 18 and 19 are out of register with their respective ports.

As the beam continues its movement through the stage illustrated in Fig. 7 the pin 29 adjacent to valve housing 12 moves the arm 27 and valve 13 so that the diametric port 18 is in register with its respective ports whereby the liquid may be withdrawn from the container 6. At the same time the valve adjacent container 5 will be moved by the weight 31 so that the diametric port 19 will be in register with its respective ports and liquid will be supplied to the container 5.

It becomes obvious from the foregoing that in order for the scale beam to function it is necessary that a definite weight differential exist between the liquids in the containers 5 and 6. This weight differential is brought into existence by the removal of liquid from a previously filled container and regardless of the volume of liquid in the containers before, during or after the functioning the amount removed may be accurately measured because it is not made dependent upon volume. Further, it is pointed out that the float control of the valves has no function other than to prevent the liquid, which is supplied to the containers at a rate faster than it is withdrawn, from overflowing the containers and the accuracy of the measurements is not dependent in any way upon these float controls.

It also becomes apparent that as a rocking movement of the scale beam takes place it indicates that a definite amount of liquid, corresponding with the weights 37, will be discharged before another rocking movement takes place. Therefore, in the event that large quantities are to be measured the invention contemplates the use of a conventional counting device for mechanically counting the operations. Inasmuch as such counting devices are well known in the art and are available on the market the same has not been shown in detail here. The counter is generally designated by the numeral 42 and is illustrated as having its operating shaft 43 projecting through one of the brackets 2 and operated by a cam 44 on the scale beam.

Although friction conditions do not affect the accuracy of the present machine because conditions will be the same at each end of the beam, it is contemplated that in order to adapt the device for measuring minute quantities of liquid the moving parts will be provided with friction reducing bearings throughout.

Although a specific embodiment of the invention has been illustrated and described it will be understood that various changes may be made within the scope of the appended claims without departing from the spirit of the invention, and such changes are contemplated.

What I claim is:—

1. In combination, a support, a beam pivotally connected to said support and adapted thereby for oscillatory movement, liquid containers suspended from opposite ends of said beam, liquid supply and liquid outlet means in communication with said containers, valves adapted to control the supply and outlet of liquid with respect to said containers, means on said beam adapted to operate said valves upon oscillating movement of said beam, and a float in each container having means for operating said valves to disconnect said supply from said containers.

2. A liquid metering device comprising a beam, means pivotally supporting said beam intermediate its ends, liquid containers mounted on the ends of said beam and supported thereby in counterpoise relation, liquid supply means and liquid outlet means common to said containers, valves controlling said liquid supply and outlet means, means supporting said liquid supply and outlet means and said valves structurally separate from said containers, floats in said containers and operatively connected to said supply controlling valves whereby actuation of said floats closes said valves, means on said beam adapted upon movement thereof to actuate said outlet controlling valves, means on said beam operatively connected with said supply controlling valves, and means for inhibiting movement of said beam in response to different liquid weights in said containers until such time as the weight of liquid in one container exceeds that in the other container by a predetermined amount.

3. A liquid metering device comprising a beam, means pivotally supporting said beam between its ends, a pair of containers adapted for the reception of a liquid, means connecting said containers to opposite ends of said beam whereby said beam supports said containers in counterpoise relation, a liquid supply conveyor and a liquid outlet conveyor common to both containers, valves for controlling said supply and outlet conveyors, means supporting said supply and outlet conveyors and said valves structurally separate from said containers, said supply conveyor being adapted to supply liquid to said containers more rapidly than said outlet conveyor exhausts the liquid therefrom, floats in said containers and operatively connected to the valves controlling said supply conveyors whereby they prevent overflowing of said containers, means on said beam and operatively connected with the supply and outlet conveyor valves whereby movement of said beam actuates said valves, and means inhibiting movement of said beam until such time as the weight of liquid in a full container exceeds that in the other container by a predetermined amount, movement of said beam in one direction after release of said inhibiting means being adapted to connect one container with the supply conveyor and the other with the outlet conveyor and movement of the beam in the reverse direction being adapted to reverse the order of supply and outlet connections with respect to said containers.

4. A liquid metering device comprising a beam, means pivotally supporting said beam between its ends, containers suspended by said beam in counterpoise relation, means for supplying liquid to and for removing liquid from said containers, float controlled means adapted to render said means for supplying liquid inoperative, control means actuated by movement of said beam for rendering said supply means operative and for rendering said liquid removing means operative and inoperative, said control means being adapted to cause liquid to be supplied to one container and removed from the other by movement of said beam in one direction and to reverse the order of supply and removal upon movement of the beam in the other direction, and means for inhibiting movements of said beam until such time as the weight of liquid in one container exceeds that in the other container by a predetermined amount, said last named means comprising a pair of levers having means thereon for the reception of weights, a pawl pivoted on each lever, each pawl having resiliently yieldable means opposing pivotal movement thereof in one direction and positive means opposing pivotal movement in the other direction, and means on said beam adapted to strike each pawl in such manner that pivotal movement of said beam can take place only when the weight of liquid in one container exceeds that in another container by an amount sufficient to rock said levers by lifting the weighted ends thereof.

5. In combination, a support, a beam pivotally connected to said support and adapted thereby for oscillatory movement, liquid containers suspended from opposite ends of said beam, liquid supply and liquid outlet means in communication with said containers, valves adapted to control the supply and outlet means with respect to said containers, said valves being correlated whereby they automatically function to supply liquid to either container while the other is being emptied, means on said beam adapted to operate said valves upon oscillating movement of said beam, means for inhibiting movement of said beam, said liquid supply and liquid outlet means being correlated whereby the liquid is supplied to the containers faster than it is exhausted, and means for automatically rendering the liquid supply means inoperative when a container is filled, said inhibiting means being adapted to release said beam to permit movement thereof when the weight of liquid in one container diminishes to a point where it is outweighed by the liquid in the other container by a predetermined amount.

6. In combination, a support, a beam pivotally connected to said support and adapted thereby for oscillatory movement, liquid containers suspended from opposite ends of said beam, liquid conveyors carried by said support and extending into said containers, a two-way valve in each conveyor, liquid supply and liquid exhaust conveyors connected to said valves, each valve having an operating arm adapted upon movement thereof to actuate said valves to connect said first named conveyors with said second named conveyors, and means on said beam adapted upon movement thereof in one direction to engage said valve operating arms in such manner as to connect one of the first named conveyors with the supply conveyor and the other with the exhaust conveyor and upon movement thereof in the opposite direction to reverse the order of connections.

7. In combination, a support, a beam pivotally connected to said support and adapted thereby for oscillatory movement, liquid containers suspended from opposite ends of said beam, liquid conveyors mounted on said support and extending into said containers, a valve in each conveyor and carried by said support adjacent opposite ends of said beam, each valve having an operating arm, and elements carried by said beam on opposite sides of its pivot and adapted to engage said operating arms upon movement of said beam to actuate said valves, a float in each container, and means operatively connecting said floats with said valves.

8. In combination, a support, a beam pivotally connected to said support and adapted thereby for oscillatory movement, liquid containers suspended from opposite ends of said beam, liquid conveyors carried by said support and extending into said containers, a two-way valve in each conveyor, liquid supply and liquid exhaust conveyors connected to said valves, each valve having an operating arm adapted to actuate its respective valve upon movement thereof to connect said first named conveyors with said second named conveyors, means on said beam adapted upon movement thereof in one direction to engage said valve operating arms and actuate said valves in such manner as to connect one of the first named conveyors with the supply conveyor and the other with the exhaust conveyor and upon movement thereof in the opposite direction to reverse the order of connections, floats in said containers, and means operatively connecting said floats with said valves whereby upon actuation thereof they move said valves to sever connection between the first named conveyors and said supply conveyor.

9. In combination, a support, a beam pivotally connected to said support and adapted thereby for oscillatory movement, liquid containers suspended from opposite ends of said beam, liquid conveyors communicating with said containers, valves in said conveyors and carried by said support, supply and exhaust conveyors connected to said valves, said valves having means therein for connecting said first named conveyors to said second named conveyors and means for maintaining said first named conveyors out of communication with said supply and exhaust conveyors, operating means on said valves, means on said beam adapted upon movement thereof to actuate said operating means and valves whereby said first named conveyors are placed in communication with supply and outlet conveyors respectively, and float actuated means connected to said valves to move the same to positions preventing communication between said first and second named conveyors.

WILLIAM S. CLARKSON.